Patented Feb. 8, 1949

2,461,291

UNITED STATES PATENT OFFICE 2,461,291

MANUFACTURE OF DRIED MEAT

Harry H. McKee, Chicago, Ill., assignor to Swift & Company, Chicago, Ill., a corporation of Illinois No Drawing. Application December 7, 1944, Serial No. 567,123

8 Claims. (Cl. 99—159)

The present invention relates to a method for preparing a dried cured meat product and more particularly to a chipped beef.

In preparing a chipped beef according to the conventional processes now in use, a considerable period of time, usually many days, is required. The meat is usually cured, smoked and dried in bulk form. The curing solution and smoke must penetrate to the innermost portions of the meat and upon drying, the water content must be removed from these innermost portions. It is readily understandable, therefore, that these long periods of time are necessary.

It is an object of the present invention to provide a process for preparing sliced dried beef of excellent taste and appearance in only a fraction of the time required by the present prior art methods as outlined above.

Another object of this invention is to provide a process for the rapid curing of a wafer-thin beef product.

Still another object of the present invention is to provide a method of the smoking of a thin, sliced meat in such a manner that complete exposure of all of the surface of the slice is accomplished while the slice is held against distortion.

A still further object of the invention is to provide a process for preparing a dried, sliced beef product of excellent appearance and taste, which, however, requires only a fraction of the time necessary to carry out the prior art methods.

Other and further objects of the invention will be apparent from the following detailed description thereof.

The invention in its entirety may be briefly outlined as follows:

1. Preparing wafer-thin slices of fresh beef.
2. Curing the wafer-thin slices in a conventional curing solution.
3. Smoking and drying the cured, wafer-thin slices.

Referring in greater detail to the various steps of the present invention, in order to prepare the wafer-thin slices of the fresh beef, beef hams are boned, trimmed and fatted and then cut into insides and outsides. The outsides and insides are then placed into suitable molds to be shaped into loaves of the desired size.

These loaves may then be sliced by any suitable means, but a preferred method of slicing is set forth in the patent to William J. Dubil, 2,052,221 of August 25, 1936. According to the process set forth therein, the meat is subjected while still in the mold to temperatures such that it becomes frozen solid. The temperature of the meat is then raised until a partial thawing takes place which removes the solidity, this latter step being referred to as tempering. After tempering, the meat is readily sliced in a slicing machine to a thickness of approximately $1/16''$.

In order to cure the beef slices so prepared, they are submerged in a conventional curing solution which may comprise a solution of salt, water and sodium nitrite. The temperature of this solution is preferably maintained at 90° to 100° F. After the dipping operation, the beef slices are placed in an air temperature of 190° to 200° F. to complete a rapid curing of the meat. If unprotected, this would result in slices which were dried, curled and unfit for use. It has been found, however, that this may be prevented by confining the slices in extended position between two relatively disposed impervious sheets having flat surfaces. These sheets are preferably of a material such as metal so that the heat will penetrate rapidly and expedite the curing action.

It is readily seen that by this expedient, while the thin slices are uniformly subjected to an elevated temperature, the impervious nature of the sheets prevents the loss of any substantial amount of water at this stage of the operation and moreover, the thin slices are maintained in a flat extended condition and not permitted to shrivel or curl. The curing step can be readily accomplished in a period of time ranging from 10 minutes to 30 minutes.

In order to accomplish the smoking and drying of the cured slices, the slices are removed from between the impervious sheets and positioned between screens which may suitably be of wire mesh or any other type of sheet containing a large number of apertures. The slices so positioned are subjected to an atmosphere of heavy smoke and a temperature which preferably ranges between 170° and 175° F. This treatment also prevents curling of the slices which would occur if the slices were not confined. The mesh-like structure of the screens, however, allows complete exposure of the surface of the slice to the high temperature smoke.

For the best operation of this step of the process, the screens should be turned over once during the drying period and a good circulation of air maintained at all times. The smoking and drying may also be accomplished in a period of time ranging between 10 and 30 minutes and after such periods, a completed product is obtained which is then ready to be packaged and merchandised.

The product prepared by using the above outlined process was found to be a chipped beef of excellent appearance and taste. It was found that it was possible to carry out the entire process in approximately 35 minutes as compared to the many days required by the processes taught by the prior art.

While I have specified that the slices should be approximately 1/16" in thickness, it should be understood that this thickness may be varied somewhat, for example, I contemplate using slices of thickness between about 1/8 and 1/32 inches.

Obviously, many modifications and variations of the invention hereinbefore set forth may be made without departing from the spirit and scope thereof, and therefore, only such limitations should be imposed as are indicated in the appended claims.

I claim:

1. The process of preparing sliced dried beef from fresh meat comprising: slicing said meat into wafer thin slices; immersing said slices in a curing solution; withdrawing said slices from said curing solution and confining said slices between impervious surfaces maintained at an elevated temperature of about 190° to 200° F. for a period of time sufficient to cure said meats; removing said slices from between said impervious surfaces; placing said slices between apertured sheets; and subjecting said slices between said sheets to an atmosphere of smoke and an elevated temperature of about 170° to 175° F. for a period of time sufficient to smoke and dry said meat.

2. The method of curing a thin slice of fresh beef comprising: immersing said slice of a thickness of about 1/8 to 1/32 inch in a curing solution; removing said slice from said curing solution; and confining said slice in an extended position between impervious surfaces maintained at an elevated temperature of about 190° to 200° F. for a period of time of about 10 to 30 minutes to quick cure said meat.

3. The method of smoking and drying a thin beef slice comprising: confining said slice of wafer thin thickness between apertured sheets in an extended position to prevent curling and subjecting said slice between said sheets to an atmosphere of smoke and an elevated temperature of about 170° to 175° F. for a period of time of about 10 to 30 minutes to smoke and dry said meat.

4. In a process for quick curing a wafer thin beef slice including applying to said slice a curing solution and subjecting said slice for a time period in the range of about 10 to 30 minutes to an elevated temperature of about 190° to 200° F., the step of confining said slice in an extended position between impervious flat surfaces while said slices are being subjected to said elevated temperature.

5. The process of preparing sliced dried beef from fresh meat comprising: slicing said meat into slices of approximately 1/16" thickness; immersing said slices in a curing solution at 90°–100° F.; removing said slices from said curing solution; confining said slices in a flat extended position between impervious surfaces having a temperature of 190°–200° F. for a period of time sufficient to cure said meat; removing said slices from between said impervious surfaces; confining said slices in an extended position between apertured sheets; and subjecting said slices between said sheets to an atmosphere of smoke and a temperature of 170°–175° F.

6. The process of preparing sliced dried beef from wafer thin slices of fresh meat which has been treated with a curing solution and any excess curing solution removed which comprises, subjecting said slices containing curing solution to a quick curing operation at an elevated air temperature of around 190° to 200° F. while protecting said slices from the air to prevent drying, then subjecting the cured slices to a drying operation at a temperature of around 170° to 175° F. while exposing the surfaces to the air and in an extended position to prevent curling.

7. The process of preparing sliced dried beef which comprises, slicing the beef into wafer thin slices, applying a curing solution to said slices, and then subjecting the slices to quick curing, smoking and drying operations at elevated temperatures; the curing operation being carried out at a temperature within the range of about 190° to 200° F. while protecting the surfaces of the slices from substantial evaporation of moisture, and the subsequent smoking and drying operations being carried out at a temperature within the range of about 170° to 175° F. while exposing the surfaces to air drying and in an extended position to prevent curling.

8. The process of preparing sliced dried beef which comprises: slicing the beef into slices of a thickness of about 1/8 to 1/32 inch, applying to said slices a curing solution, subjecting said slices containing curing solution to a quick curing operation at a temperature within the range of about 190° to 200° F. for a period of time within the range of about 10 to 30 minutes while protecting said slices from the atmosphere to prevent drying, and then subjecting said slices to a drying operation at a temperature within the range of about 170° to 175° F. for a period of time within the range of about 10 to 30 minutes while exposed to the atmosphere and in an extended position to prevent curling.

HARRY H. McKEE.

REFERENCES CITED

The following references are of record in the file of this patent:

UNITED STATES PATENTS

| Number | Name | Date |
|---|---|---|
| 136,165 | Johnson et al. | Feb. 25, 1873 |
| 512,786 | Zehner et al. | Jan. 16, 1894 |
| 1,271,962 | Trescott | July 9, 1918 |
| 2,052,221 | Dubil | Aug. 25, 1936 |
| 2,135,334 | Guthrie et al. | Nov. 1, 1938 |